United States Patent [19]

Bannai et al.

[11] Patent Number: 4,928,901
[45] Date of Patent: May 29, 1990

[54] CABLE REEL

[75] Inventors: Hiroyuki Bannai; Yuichi Ida; Hironori Kato, all of Miyagi, Japan

[73] Assignee: Alps Electric Co., Ltd., Tokyo, Japan

[21] Appl. No.: 311,927

[22] Filed: Feb. 16, 1989

[30] Foreign Application Priority Data

Apr. 30, 1988 [JP] Japan .............................. 63-57305[U]

[51] Int. Cl.$^5$ ....................... B65H 75/02; H01R 39/00
[52] U.S. Cl. .................................... 242/85; 242/54 R; 439/15
[58] Field of Search ................ 242/84.8, 85, 107.4 R, 242/54 R; 439/15, 27, 163, 164

[56] References Cited

U.S. PATENT DOCUMENTS 4,657,326  4/1987  Zeller et al. ......................... 339/35
4,744,763  5/1988  Suzuki et al. ........................ 439/15
4,824,396  4/1989  Sasaki et al. ...................... 439/15 X Primary Examiner—John Petrakes
Assistant Examiner—Steven M. duBois
Attorney, Agent, or Firm—Guy W. Shoup; Paul J. Winters

[57] ABSTRACT

In a cable reel including a fixed member having an outer ring wall, a movable member having an inner ring wall and rotatably mounted to the fixed member, and a cable wound with a plurality of turns between the fixed member and the movable member and having opposite ends fixed to the outer ring wall and the inner ring wall, wherein when the movable member is rotated in either of a winding direction or an unwinding direction of the cable, the cable is wound up around the inner ring wall or is unwound to the outer ring wall; the improvement comprises a stopper formed of a rigid material and fixed to the cable at a position near the inner circumferential end thereof, wherein when the cable is unwound by a predetermined amount or more, the stopper stands to stop between the cable unwound to the outer ring wall and the cable inverted on the inner ring wall.

2 Claims, 5 Drawing Sheets

CABLE REEL

BACKGROUND OF THE INVENTION

The present invention relates to a cable reel having a flat cable utilized for electrical connection between a fixed member and a movable member, and more particularly to a cable reel suitable for use with a steering device for an automobile.

A cable reel includes a flat cable constructed under a wound condition with a plurality of turns. The flat cable is fixed at its one end to a fixed member, and is also fixed at the other end to a movable member. The flat cable extends from both ends to the outside of the cable reel. When the movable member is rotated, the flat cable is wound up around the movable member, or it is unwound from the movable member. Thus, the movable member is allowed to be rotated by a predetermined amount. For example, the cable reel is used in a steering device for an automobile.

FIGS. 5 to 7 show a conventional cable reel for an automobile, wherein FIG. 5 is an exploded perspective view of the cable reel; FIG. 6 is a vertical sectional view of the cable reel; and FIG. 7 is a plan view of the cable reel with a part of the movable member omitted. Referring to these drawings, reference numeral 1 designates a movable member centrally formed with a cylindrical inner ring wall 3 having a shaft insertion hole 2. A cylindrical holder 4 is provided around the inner ring wall 3. The holder 4 has a vertical slit 4a and an inside recess 4b. Specifically, the holder 4 is fixed to a top portion of the movable member 1 in such a manner that a predetermined annular space is defined between the inner surface of the holder and the outer surface of the inner ring wall 3.

Reference numeral 5 designates a flat cable formed by laminating a plurality of conductors such as copper foils between two flexible base films formed of polyethylene terephthalate (PET), for example. The flat cable 5 is inserted at its one end portion through the slit 4a of the holder 4, and is received in the recess 4b. The one end portion of the flat cable 4 is longitudinally divided into a pair of leading portions 5a, which are in turn bent back at about 45 degrees to extend along the recess 4b. The pair of leading portions 5a in the recess 4b are overlapped with each other and bonded in a snap fashion to each other. The leading portions 5a thus bonded are held between first and second holders 6 and 7 fixed to the top portion of the movable member 1. Under the condition, a tapering portion 6a of the first stopper 6 is inserted into the bent portions of the leading portions 5a.

Reference numeral 8 designates a fixed member formed with a central hole 9 for rotatably inserting the inner ring wall 3 of the movable member 1. The fixed member 8 is formed at its outer circumference with an outer ring wall 10 for surrounding the flat cable 5. The outer ring wall 10 is formed with a guide portion 11 projecting obliquely downwardly therefrom for guiding the other end portion of the flat cable 5. Specifically, the other end portion of the flat cable 5 is bent back at about 45 degrees at the guide portion 11, and is led out of the fixed portion 8 through the guide portion 11. The outer ring wall 8 is further provided with a positioning mechanism 13 having a gear 12 adapted to engage a projection 14 formed at the outer circumference of the movable member 1. Every time the movable member 1 is rotated 360 degrees, the gear 12 is brought into engagement with the projection 14 and is therefore rotated by a given angle.

The cable reel thus constructed is actually used in such a manner that the movable member 1 is mounted on a steering wheel side of a steering device for an automobile and the fixed member 8 is mounted on a bearing side of a steering shaft. When the steering wheel (the movable member 1) is rotated in one direction, the flat cable 5 is wound up on the holder 4 (the inner ring wall) of the movable member 1. Reversely, when the steering wheel is rotated in the other direction, the flat cable 5 is unwound on the outer ring wall 10 of the fixed member 8. Under any conditions, electrical connection between the movable member 1 and the fixed member 8 is ensured via the flat cable 5. Further, every time the movable member 1 is rotated 360 degrees, the gear 12 is brought into engagement with the projection 14 to rotate by a given angle. Therefore, a specific tooth of the gear 12 and a case of the positioning mechanism are marked respectively so as to eliminate a difference in rotational amount in opposite directions of the flat cable 5, thus preventing breakage and buckling of the flat cable 5.

However, nevertheless the positioning mechanism is provided to properly position the movable member 1 and the fixed member 8, it is hard to completely eliminate erroneous mounting of the cable reel. That is, there is a possibility that the movable member 1 is mounted at a position rotationally offset from a neutral position in either direction. In the case that the movable member 1 is erroneously mounted in such a manner that a rotational amount of the movable member 1 in a winding direction of the flat cable 5 is less, when the movable member 1 is rotated by a predetermined amount or more, a tension in the winding direction is applied to the flat cable 5. Therefore, a cutter may be provided on the fixed member 8 at a position opposed to the bent portion of the flat cable 5, so as to forcibly cut the flat cable 5 by the cutter and electrically detect the erroneous mounting.

Reversely in the case that the movable member 1 is erroneously mounted in such a manner that the rotational amount of the movable member 1 in an unwinding direction is less, even when the movable member 1 is rotated by a predetermined amount or more, the flat cable 5 is inverted at its inner circumferential end portion as shown in FIGS. 8(a), 8(b) and 8(c). In this manner, the excessive rotation of the movable member 1 cannot be avoided, and the erroneous mounting cannot be therefore electrically detected. Further, once the flat cable 5 is inverted as mentioned above, such inversion will be readily repeated upon subsequent rotation of the movable member 1, causing sudden disconnection of the flat cable 5 in use.

It is proposed that a reinforcing film is fixed to the inner ring wall of the movable member along the inner circumferential end of the flat cable so as to suppress the inversion of the flat cable by the flexural rigidity of the reinforcing film (Japanese Utility Model Laid-Open Publication No. 62-168581). According to this technique, the reinforcing film must be flexed so as not to hinder the winding operation of the flat cable. Therefore, it is impossible to completely eliminate the inversion of the flat cable owing to the flexural rigidity of the reinforcing film only. Consequently, the problem of disconnection of the flat cable due to the erroneous mounting has not yet been solved in the prior art.

SUMMARY OF THE INVENTION

Accordingly, it is an object of the present invention to provide a cable reel which may eliminate the erroneous mounting of the movable member by forcibly cutting the cable and improve the reliability of the electrical connection.

According to the present invention, there is provided in a cable reel including a fixed member having an outer ring wall, a movable member having an inner ring wall and rotatably mounted to said fixed member, and a cable wound with a plurality of turns between said fixed member and said movable member and having opposite ends fixed to said outer ring wall and said inner ring wall, wherein when said movable member is rotated in either of a winding direction or an unwinding direction of said cable, said cable is wound up around said inner ring wall or is unwound to said outer ring wall; the improvement comprising a stopper formed of a rigid material and fixed to said cable at a position near the inner circumferential end thereof, wherein when said cable is unwound by a predetermined amount or more, said stopper stands to stop between said cable unwound to said outer ring wall and said cable inverted on said inner ring wall.

With this arrangement, when the cable reel is mounted to an equipment such as a steering device under the condition where the movable member and the fixed member are properly positioned, the cable is wound with the stopper to the inner ring wall by the rotation of the movable member in one direction, while the cable is unwound to the outer ring wall by the rotation of the movable member in the other direction. In the case that the cable reel is erroneously mounted in such a manner that the rotational amount of the movable member in the unwinding direction of the cable is less, when the movable member is rotated in this direction by a predetermined amount or more, the stopper formed of a rigid material stands like a prop between the cable unwound to the outer ring wall and the inner ring wall. Accordingly, although the cable is inverted between the stopper and the inner ring wall, further inversion of the cable can be prevented by the stopper. As a result, a tension in the unwinding direction is applied to the cable by the excessive rotation of the movable member in this direction, and the cable is urged to the cutter by the tension to be forcibly cut by the cutter. Thus, the erroneous mounting of the cable reel can be electrically detected.

Other objects and features of the invention will be more fully understood from the following detailed description and appended claims when taken with the accompanying drawings.

DETAILED DESCRIPTION OF THE PREFERRED EMBODIMENTS

Figure 1:
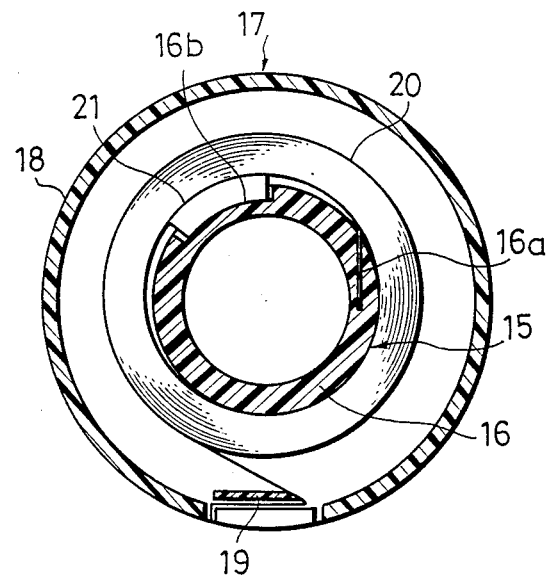
FIG. 1 is a plan view in partial section of the cable reel according to a preferred embodiment of the present invention.

Referring to FIG. 1 which shows the preferred embodiment of the present invention, reference numeral 15 designates a movable member centrally provided with an inner ring wall 16 having a central hole. The inner ring wall 16 is formed with an axially extending slit 16a and an arcuate recess 16b on the outer circumference. The arcuate recess 16b functions as a space for receiving a stopper 21 which will be hereinafter described. When the stopper 21 has a small thickness, the arcuate recess 16b is not required. Reference numeral 17 designates a fixed member provided with a cylindrical outer ring wall 18 at the outer circumference. A cutter 19 having a knife-edge like end is provided in the vicinity of the outer ring wall 18. Reference numeral 20 designates a flat cable having an inner circumferential end inserted through the slit 16a and fixed in the inner ring wall 16, then being led out of the movable member 15. An outer circumferential end of the flat cable 20 is doubled back at the cutter 19, and is fixed in the outer ring wall 18, then being led out of the fixed member 17.

Figure 2:
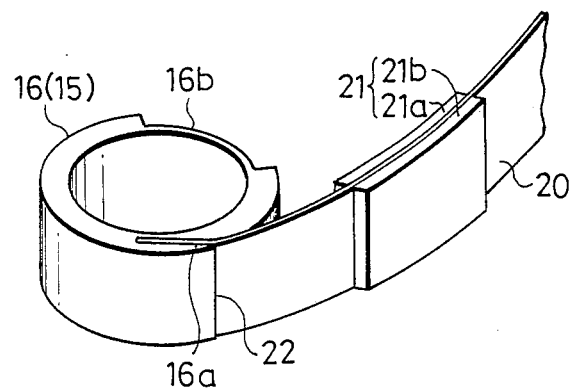
FIG. 2 is an enlarged perspective view of the essential part shown in FIG. 1.
Figures 3A, 3B:
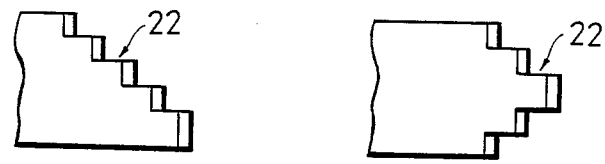
FIG. 3(a) and 3(b) are plan views of the cutter portion shown in FIG. 2.
Figure 4:
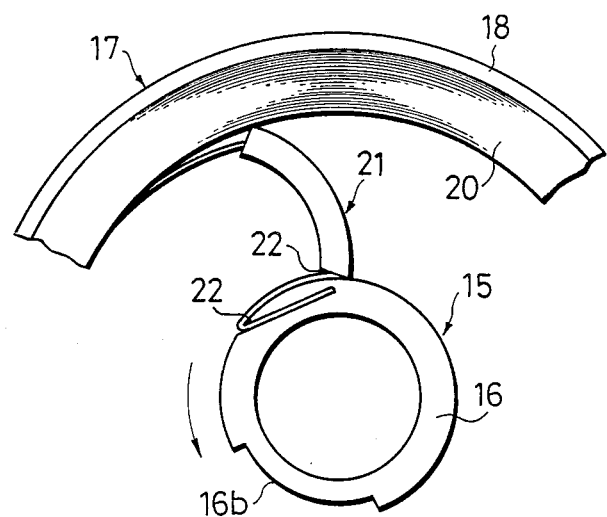
FIG. 4 is a plan view of the essential part showing the operation of the present invention.
Figure 5:
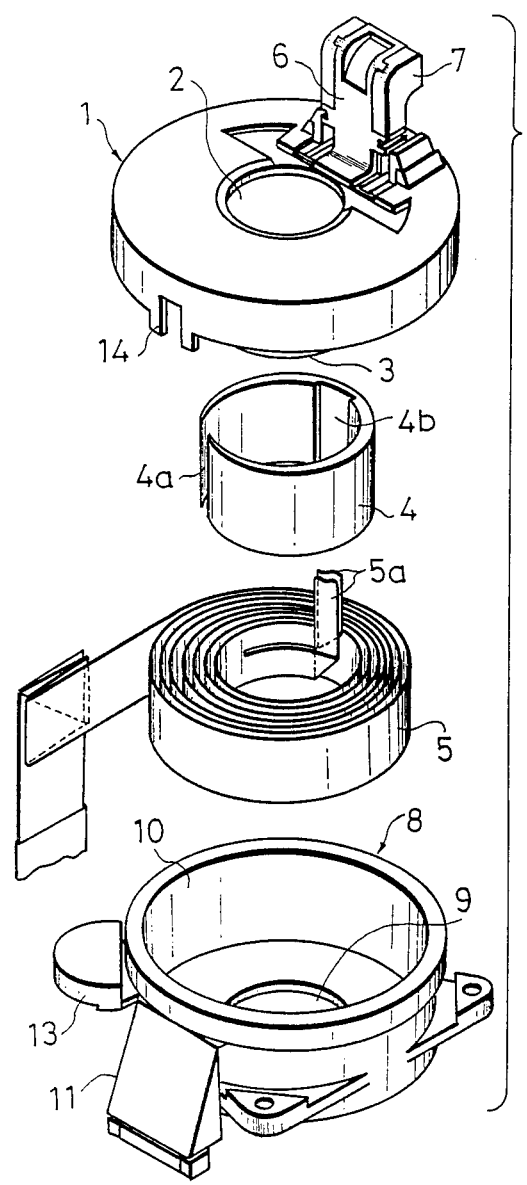
FIG. 5 is an exploded perspective view of the conventional cable reel.
Figure 6:
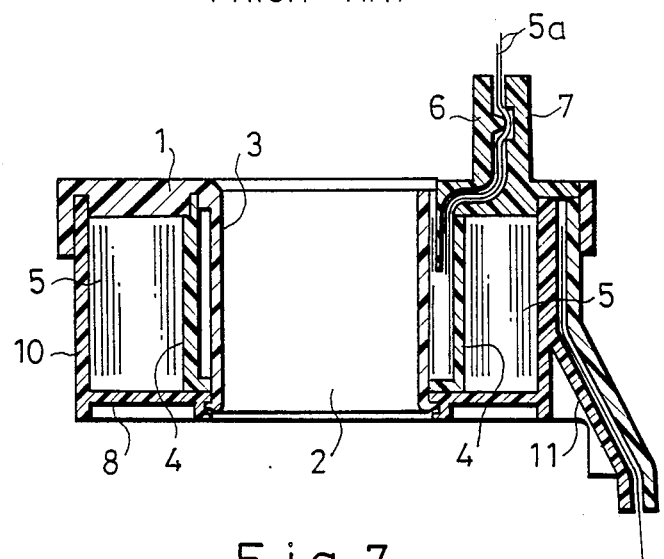
FIG. 6 is a vertical sectional view of the cable reel shown in FIG. 5.
Figure 7:
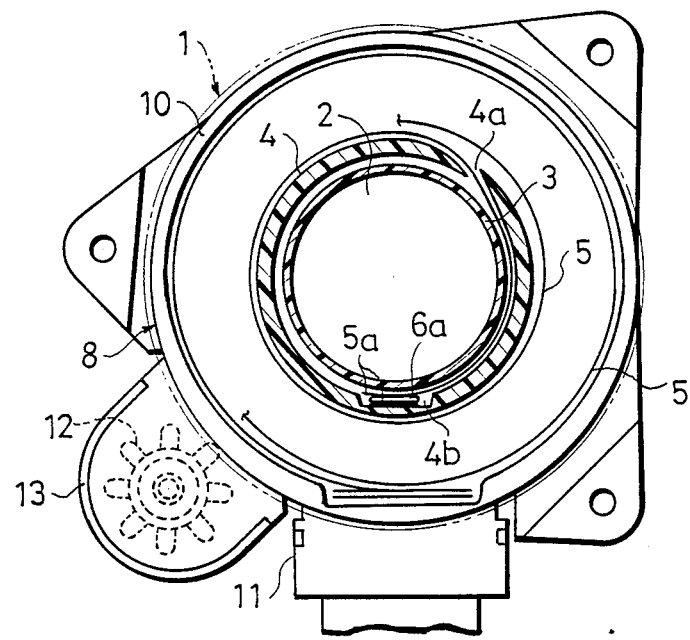
FIG. 7 is a plan view of the cable reel shown in FIG. 5 with a part of the movable member omitted.
Figure 8A:
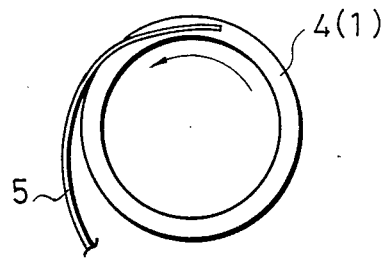
FIGS. 8(a), 8(b) and 8(c) are schematic illustration of the inversion of the flat cable in the conventional cable reel.
Figure 8B:
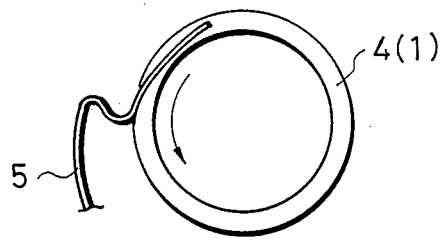
Figure 8C:
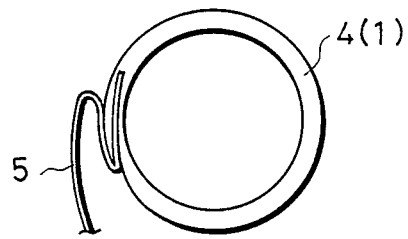

Referring to FIG. 2, the stopper 21 is fixed to the flat cable 20 at a position near the inner circumferential end thereof. The stopper 21 has a curvature similar to that of the recess 16b. The stopper 21 is formed of an insulating and rigid material such as synthetic resin or ceramics. In the preferred embodiment, the stopper 21 is formed from first and second stopper plates 21a and 21b of hard synthetic resin, and both the stopper plates 21a and 21b are fixed to opposite surfaces of the flat cable 20 by ultrasonic bonding or adhesive. Although briefly shown in FIGS. 1 and 2, either of an end of the first stopper plate 21a or an opening end of the slit 16a (or both of the end of the first stopper plate 21a and the opening end of the slit 16a) is formed with a cutter portion 22 for allowing ready cutting of the flat cable 20 between the ends of the first stopper plate 21a and the slit 16a. FIGS. 3(a) and 3(b) show some examples of the cutter portion 22, wherein the cutter portion 22 shown in FIG. 3(a) has a generally oblique end formed by a plurality of stepped cutting elements each having a knife-edge like end, while the cutter portion 22 shown in FIG. 3(b) has a generally V-shaped end formed by a plurality of stepped cutting elements each having a knife-edge like end. Although not shown in FIG. 1, the cable reel of the preferred embodiment is provided with a positioning mechanism similar to the prior art mechanism mentioned previously.

In installing the cable reel thus constructed to a steering system, the movable member 15 and the fixed member 17 are first positioned under a proper condition by using the positioning mechanism, in such a manner that the flat cable 20 may be rotated in opposite directions by the same amount. Then, the inner ring wall 16 of the movable member 15 is mounted to a steering shaft of the steering system, and the fixed member 17 is mounted to a fixed member of a vehicle body. In the case that the flat cable 20 is properly mounted in this manner, the flat cable 20 is wound around the inner ring wall 16 or it is unwound to the outer ring wall 18 by rotating the steering wheel (the movable member 15). FIG. 1 shows a condition where the flat cable 20 is wound up around the inner ring wall 16. Under the condition, the stopper 21 is received in the recess 16b, and the flat cable 20 is wound along the continuous surface formed by the outer circumferential surface of the inner ring wall 16 and the outer circumferential surface of the stopper 21.

In the case that the movable member 15 is erroneously mounted in a position rotationally offset from the neutral position in such a manner that a rotational amount of the movable member 15 in a winding direction of the flat cable 20 is less, when the steering wheel is rotated in the winding direction by a predetermined amount or more, a tension in this direction is applied to the flat cable 20, and accordingly the flat cable 20 is readily cut by the cutter 19.

To the contrary, in the case that the movable member 15 is erroneously mounted in such a manner that a rotational amount of the movable member 15 in an unwinding direction of the flat cable 20 is less, when the steering wheel is rotated in the unwinding direction of the flat cable by a given amount, the flat cable 20 is first unwound to the outer ring wall 18, and when the steering wheel is further rotated in this direction, the inner end portion of the flat cable 20 tends to be inverted. Under the inverted condition, the stopper 21 stands like a prop between the flat cable 20 unwound to the outer ring wall 18 and the inner ring wall 16, thereby stopping the further inversion of the flat cable 20 between the inner ring wall 16 and the stopper 21. Accordingly, a tension in the unwinding direction is applied to the flat cable 20, and the flat cable 20 is readily cut by the cutter portion 22 formed at the end of the stopper 21 or the opening end of the slit 16a.

As described above, not only in the case that the movable member 1 is erroneously mounted in such a manner that the rotational amount thereof in the winding direction of the flat cable 20 is less, but also in the case that the movable member 1 is erroneously mounted in such a manner that the rotational amount thereof in the unwinding direction of the flat cable 20, which case is hard to cope with in the prior art, a tension is applied to the flat cable 20 to readily cut the flat cable 20. Accordingly, the erroneous mounting of the cable reel may be electrically detected.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a cable reel including a fixed member having an outer ring wall, a movable member having an inner ring wall and rotatably mounted to said fixed member, and a cable wound with a plurality of turns between said fixed member and said movable member and having opposite ends fixed to said outer ring wall and said inner ring wall, wherein when said movable member is rotated in either of a winding direction or an unwinding direction of said cable, said cable is wound up around said inner ring wall or is unwound to said outer ring wall; the improvement comprising:

a stopper formed of a rigid material and fixed to said cable at a position near the inner circumferential end thereof, wherein when said cable is unwound by a predetermined amount or more, said stopper interposes as a prop between said cable unwound to said outer ring wall and said cable inverted on said inner ring wall, thereby stopping further inversion of said cable, at least one of said stopper and said inner ring wall provided with a cutter portion for cutting said cable when a tension in the unwinding direction is applied to said cable.

2. The cable reel as defined in claim 1 further comprising a cutter having a knife-edge like end provided in the vicinity of said outer ring wall, wherein the outer circumferential end of said cable is doubled back at said cutter, and is fixed to said outer ring wall, then being led out of said fixed member.

* * * * *

UNITED STATES PATENT AND TRADEMARK OFFICE
CERTIFICATE OF CORRECTION

PATENT NO. : 4,928,901
DATED : May 29, 1990
INVENTOR(S) : Hiroyuki Bannai

It is certified that error appears in the above-identified patent and that said Letters Patent is hereby corrected as shown below:

On the title page item [30],
Priority patent

"63-57305" should read --63-57303--

Signed and Sealed this

Twentieth Day of August, 1991

Attest:

HARRY F. MANBECK, JR.

Attesting Officer

Commissioner of Patents and Trademarks